(12) United States Patent
Hamrock et al.

(10) Patent No.: US 7,285,349 B2
(45) Date of Patent: Oct. 23, 2007

(54) POLYMER ELECTROLYTE MEMBRANE AND METHOD OF MAKING

(75) Inventors: Steven J. Hamrock, Stillwater, MN (US); Linda M. Rivard, Stillwater, MN (US); Michael A. Yandrasits, Hastings, MN (US); Daniel M. Pierpont, North Saint Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 500 days.

(21) Appl. No.: 10/697,831

(22) Filed: Oct. 30, 2003

(65) Prior Publication Data

US 2005/0095487 A1    May 5, 2005

(51) Int. Cl.
*H01M 8/10* (2006.01)
*C08J 5/22* (2006.01)

(52) U.S. Cl. .......................................... 429/33; 521/27
(58) Field of Classification Search ................ 429/30, 429/33; 521/25, 27
See application file for complete search history.

(56) References Cited

U.S. PATENT DOCUMENTS

| | | | |
|---|---|---|---|
| 4,358,545 A | | 11/1982 | Ezzell et al. |
| 4,417,969 A | | 11/1983 | Ezzell et al. |
| 4,423,157 A | * | 12/1983 | Masuda ........................ 521/27 |
| 5,004,648 A | * | 4/1991 | Hane et al. ................... 428/364 |
| 5,302,269 A | * | 4/1994 | Eisman et al. ............. 429/33 X |
| 6,277,521 B1 | | 8/2001 | Gao et al. |
| 6,624,328 B1 | | 9/2003 | Guerra |
| 6,649,299 B2 | * | 11/2003 | Appleby et al. .......... 429/30 X |
| 2004/0121210 A1 | * | 6/2004 | Hamrock et al. ............. 429/33 |

FOREIGN PATENT DOCUMENTS

| | | |
|---|---|---|
| JP | SHO 58-93728 | 6/1983 |
| WO | WO86/06879 | 11/1986 |

OTHER PUBLICATIONS

Zaluski, C. and Xu, G. "Blends of Nafion and Dow Perfluorosulfonated Ionomer Membranes", Macromolecules, 1994, vol. 27, pp. 6750-6754, month unknown.

Moore and Martin, *"Morphology and Chemical Properties of the Dow Perfluorosulfonate Ionomers"*, Macromolecules, 1989, vol. 22, pp. 3594-3599, month unknown.

U.S. Appl. No. 10/325,275, Dec. 19, 2002, Polymer Electrolyte Membrane.

Jian-Hui Ye and Peter S. Fedkiw; "A comoparison of Two Post-Casting Treatment Methods for Perfluorosulfonated Ionomer Films", Electrochimica Acta, Elsevier Science Publishers, Barking, G., vol. 40, No. 3. Feb. 1995, pp. 291-296.

* cited by examiner

*Primary Examiner*—Stephen J. Kalafut
(74) *Attorney, Agent, or Firm*—Philip Y. Dehl

(57) ABSTRACT

Polymer electrolyte membranes such as are used in fuel cells are provided along with methods of their manufacture. The polymer electrolyte membranes comprise polymers or blends of polymers having an equivalent weight of less than 1200 and a Tg of between 101° C. and 155° C.

24 Claims, No Drawings

POLYMER ELECTROLYTE MEMBRANE AND METHOD OF MAKING

FIELD OF THE INVENTION

This invention relates to polymer electrolyte membranes such as are used in fuel cells which comprise polymers or blends of polymers having an equivalent weight of less than 1200 and a Tg of between 101° C. and 155° C., and methods of their manufacture.

BACKGROUND OF THE INVENTION

Copolymers of tetrafluoroethylene (TFE) and a co-monomer according to the formula: $FSO_2-CF_2-CF_2-O-CF(CF_3)-CF_2-O-CF=CF_2$ are known and sold in sulfonic acid form, i.e., with the $FSO_2-$ end group hydrolyzed to $HSO_3-$, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2-CF_2-CF_2-O-CF=CF_2$ are known and used in sulfonic acid form, i.e., with the $FSO_2-$ end group hydrolyzed to $HSO_3-$, in making polymer electrolyte membranes for use in fuel cells. Moore and Martin, *Morphology and Chemical Properties of the Dow Perfluorosulfonate Ionomers, Macromolecules*, vol. 22, pp. 3594-3599 (1989) discloses Tg values for samples of this polymer having various equivalent weights, measured by differential scanning calorimetry (DSC). That article reports the Tg measurements repeated in Table I:

TABLE I

| Equivalent Weight | Tg |
|---|---|
| 635 | 177° C. |
| 803 | 179° C. |
| 909 | 165° C. |
| 1076 | 158° C. |
| 1269 | 158° C. |

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendant groups according to the formula:

$YOSO_2-CF_2-CF_2-CF_2-CF_2-O-$[polymer backbone]

where Y is $H^+$ or a monovalent cation such as an alkali metal cation. Typically, the membrane is a cast membrane. Typically, the polymer has a hydration product of greater than 22,000. Typically, the polymer has an equivalent weight of 800-1200.

U.S. Pat. Nos. 4,358,545 and 4,417,969 purportedly disclose polymers and ion exchange membranes thereof having a hydration product of less than about 22,000 and equivalent weight of 800-1500, which have a substantially fluorinated backbone and pendant groups according to the formula: $YSO_3-(CFR_f)_a(CFR'_f)_b-O-$backbone, where Y is hydrogen or an alkali metal, $R_f$ and $R'_f$ are halogen or substantially fluorinated alkyl groups, a is 0-3, b is 0-3, and a+b is at least 1.

Kokai Patent Application No. SHO 58-93728 purportedly discloses at Example 3 the copolymerization of TFE and 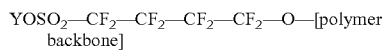$FSO_2-CF_2-CF_2-CF_2-CF_2-O-CF=CF_2$. The resulting polymer is extrusion molded to produce a film with a thickness of 150 microns and hydrolyzed, the resulting membrane having an equivalent weight of 990. This film was further treated so as to convert sulfonic acid groups to carboxylic acid groups in a thin surface layer of one side of the membrane.

Zaluski and Xu, *Blends of Nafion and Dow Perfluorosulfonated Ionomer Membranes, Macromolecules*, vol. 27, pp. 6750-6754 (1994) purportedly describes membranes comprising blends of Nafion® and Dow perfluorosulfonated ionomers. No Tg is reported for the blend. The membranes were cast onto slides and heated to 130° C.

SUMMARY OF THE INVENTION

Briefly, the present invention provides a method of making a polymer electrolyte membrane comprising the steps of: a) providing a suspension or solution of a blend of at least two miscible polymers, at least one of the polymers comprising a highly fluorinated backbone and at least one pendant group comprising a sulfonic acid group, where the blend of polymers has an equivalent weight of less than 1200 and a Tg of between 101° C. and 155° C.; b) casting a membrane from the suspension or solution; and c) annealing the membrane at a temperature Ta equal to Tg+X where X is at least 10° C. and Ta is no more than 210° C. Typically Ta is at least 135° C. More typically, the blend of polymers has a Tg of between 110° C. and 140° C. More typically, X is at least 55° C. More typically, the blend of polymers has an equivalent weight of less than 1050. Typically the membrane has a thickness of 90 microns or less.

In another aspect, the present invention provides a method of making a polymer electrolyte membrane comprising the steps of: a) providing a suspension or solution of a polymer that comprises a highly fluorinated backbone and at least two different pendant groups, at least one pendant group comprising a sulfonic acid group, wherein the polymer has an equivalent weight of less than 1200, and a Tg of between 101° C. and 155° C.; b) casting a membrane from the suspension or solution; and c) annealing the membrane at a temperature Ta equal to Tg+X where X is at least 10° C. and Ta is no more than 210° C. More typically, the polymer has a Tg of between 110° C. and 140° C. More typically, X is at least 55° C. More typically, the polymer has an equivalent weight of less than 1050. Typically the membrane has a thickness of 90 microns or less.

In another aspect, the present invention provides a method of making a polymer electrolyte membrane comprising the steps of: a) providing a suspension or solution of a polymer comprising a highly fluorinated backbone and at least one pendant group comprising a sulfonic acid group, wherein the pendent groups are not according to the formula:

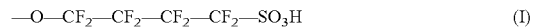

$-O-CF_2-CF_2-CF_2-CF_2-SO_3H$      (I)

wherein the polymer has an equivalent weight of less than 1200 and a Tg of less than 155° C. and greater than the Tg of a Nafion® polymer of equal equivalent weight; b) casting a membrane from said suspension or solution; and c) annealing the membrane at a temperature Ta equal to Tg+X where X is at least 10° C. and Ta is no more than 210° C. Typically Ta is at least 135° C. More typically, the polymer has a Tg of at least 101° C. and more typically between 110° C. and 140° C. More typically, X is at least 55° C. More typically, the polymer has an equivalent weight of less than 1050.

Typically the membrane has a thickness of 90 microns or less.

In another aspect, the present invention provides a polymer electrolyte membrane comprising a blend of at least two miscible polymers, at least one of the polymers comprising a highly fluorinated backbone and at least one pendant group comprising a sulfonic acid group, wherein the blend of polymers has an equivalent weight of less than 1200 and a Tg of between 101° C. and 155° C. More typically, the blend has a Tg of between 110° C. and 140° C. More typically, the blend has an equivalent weight of less than 1050. Typically the membrane is a cast, annealed membrane. Typically the membrane has a thickness of 90 microns or less.

In another aspect, the present invention provides a polymer electrolyte membrane comprising a polymer, said polymer comprising a highly fluorinated backbone and at least two different pendant groups, at least one of the pendant groups comprising a sulfonic acid group, wherein the polymer has an equivalent weight of less than 1200, and wherein the polymer has a Tg of between 101° C. and 155° C. More typically, the polymer has a Tg of between 110° C. and 140° C. More typically, the polymer has an equivalent weight of less than 1050. Typically the membrane is a cast, annealed membrane. Typically the membrane has a thickness of 90 microns or less.

In another aspect, the present invention provides a polymer electrolyte membrane comprising a polymer comprising a highly fluorinated backbone and at least one pendant group comprising a sulfonic acid group, wherein less than all of the pendent groups are according to the formula:

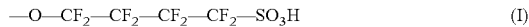

—O—$CF_2$—$CF_2$—$CF_2$—$CF_2$—$SO_3H$      (I)

wherein the polymer has an equivalent weight of less than 1200 and a Tg of less than 155° C. and greater than the Tg of a Nafion® polymer of equal equivalent weight. More typically, the polymer has a Tg of at least 101° C. and more typically between 110° C. and 140° C. More typically, the polymer has an equivalent weight of less than 1050. Typically the membrane is a cast, annealed membrane. Typically the membrane has a thickness of 90 microns or less.

What has not been described in the art, and is provided by the present invention, is a polymer electrolyte membrane meeting the equivalent weight, Tg, and structural limitations according to the present invention, which result in improved durability.

In this application:

"suspension" means suspension, dispersion or latex;

"miscible" means, with regard to two polymers in a blend, that the two polymers form a blend that demonstrates a single Tg;

"Tg" is taken as the maximum in tan delta measured by dynamic mechanical analysis (DMA) at 1 Hertz, measured on a cast, annealed sample, typically annealed at 200° C., unless stated otherwise;

"equivalent weight" (EW) of a polymer means the weight of sulfonic acid-functional polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

The present invention provides a polymer electrolyte membrane (PEM) and a method of making a PEM by casting from suspension or solution and annealing. PEM's according to the present invention demonstrate improved durability when used in PEM fuel cells.

PEM's according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layer layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

PEM's according to the present invention are typically composed of polymers having pendent groups which include sulfonic acid groups. Polymers useful in the manufacture of PEM's typically contain sulfonic acid groups. The acid-functional pendent groups typically are present in an amount sufficient to result in an equivalent weight (EW) of less than 1200, more typically less than 1150, more typically less than 1100, more typically less than 1050, more typically less than 1000, and potentially less than 900.

Applicants have found that improvements in PEM durability can be achieved by limiting Tg of the polymer or polymers making up the PEM to between 101° C. and 155° C. while maintaining EW below 1200. More typically, Tg is at least 105° C., more typically at least 110° C., more typically at least 115° C., and most typically at least 120° C. More typically, Tg is no more than 150° C., more typically no more than 140° C. and most typically at no more than 130° C. A PEM comprising a polymer that meets these limitations is disclosed in U.S. patent application Ser. No. 10/325,278, filed Dec. 19, 2002, the disclosure of which is incorporated herein by reference. That reference discloses a polymer electrolyte membrane comprising a polymer having a highly fluorinated backbone and recurring pendant groups according to the formula:

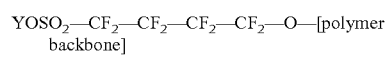

$YOSO_2$—$CF_2$—$CF_2$—$CF_2$—$CF_2$—O—[polymer backbone]

where Y is H⁺ or a monovalent cation such as an alkali metal cation. Applicants have now found that blends of miscible polymers which meet the EW and Tg limitations recited above may also be used in the manufacture of PEM's. In addition, other polymers which meet these limitation may be used, including polymers that are derived from mixed monomers, i.e., terpolymers and higher order polymers.

Without wishing to be bound by theory, the following considerations apply generally to polymer electrolytes used in PEM's according to the present invention. For a given polymer, decreasing EW represents an increase in the number of acid-functional side groups. Decreasing EW typically results in better ion conductivity but weaker physical properties for the hydrated polymer. To be an effective polymer electrolyte for fuel cell use, EW of the polymer is typically 1200 or less, more typically 1150 or less, more typically 1100 or less, and most typically 1050 or less. However, at sufficiently low EW, the polymer may dissolve and fail to function as a physical barrier. In the effective EW range, Tg typically rises with decreasing EW. (Note that Tg also rises at much higher EW levels that are not useful for fuel cell operation, possibly due to crystallinity arising in long stretches of unpopulated polymer backbone.) Manufacturing considerations may also affect membrane strength. Depending on the method of manufacture, the polymer may be heated to sinter, anneal or extrude it into a physically coherent membrane. Inadequate heating may result a physically weak product or may prevent the manufacturing process from working at all. Membranes cast from a suspension or solution are typically annealed after casting. Effective annealing, sintering or extruding typically occurs at a temperature Ta equal to Tg+X where X is at least 10° C. More typically, X is at least 25° C., more typically at least 40° C., and most typically at least 55° C. Ta is typically at least 135° C., more typically at least 145° C., more typically at least 155° C., more typically at least 165° C., and more typically at least 175° C. However, excessive Ta will lead to decomposition of the polymer electrolyte, and thus Ta is typically 210° C. or less and more typically 200° C. or less. The polymers or polymer blends according to the present invention possess sufficiently low EW to be effective as PEM's, yet also sufficiently low Tg to be annealed, sintered or extruded at a temperature that will be effective to form a physically coherent membrane without being so high as to lead to polymer decomposition. The result is a durable, manufacturable and yet effective membrane.

Any suitable polymers may be used in the practice of the present invention. Polymers useful in the practice of the present invention comprise a backbone, which may be branched or unbranched but is typically unbranched. The backbone is highly fluorinated and more typically perfluorinated. The backbone may comprise units derived from tetrafluoroethylene (TFE) and units derived from co-monomers, typically including at least one according to the formula $CF_2=CQ-R$ where Q is typically F but may also be $CF_3$, and where R is a pendent group which includes a group according to the formula $-SO_2Y$, where Y is F, Cl, Br, OH, or $-O^-M^+$, where $M^+$ is a monovalent cation, typically an alkali metal cation such as Na⁺. Y is converted to OH by hydrolysis and/or ion exchange prior to use of the po9lymer in a polymer electrolyte membrane. In an alternative embodiment, side groups R may be added to the backbone by grafting. Typically, side groups R are highly fluorinated and more typically perfluorinated. Side groups R may be aromatic but are more typically non-aromatic. Typically, R is $-R^1-SO_2X$, where $R^1$ is a branched or unbranched perfluoroalkyl or perfluoroether group comprising 1-15 carbon atoms and 0-4 oxygen atoms. $R^1$ is typically $-O-R^2-$ wherein $R^2$ is a branched or unbranched perfluoroalkyl or perfluoroether group comprising 1-15 carbon atoms and 0-4 oxygen atoms. $R^1$ is more typically $-O-R^3-$ wherein $R^3$ is a perfluoroalkyl group comprising 1-15 carbon atoms. Examples of $R^1$ include:

- $-(CF_2)_n-$ where n is 1, 2, 3, 4, 5, 6, 7, 8, 9, 10, 11, 12, 13, 14 or 15
- $(-CF_2CF(CF_3)-)_n$ where n is 1, 2, 3, 4, or 5
- $(-CF(CF_3)CF_2-)_n$ where n is 1, 2, 3, 4, or 5($-CF_2CF(CF_3)-)_n-CF_2-$ where n is 1, 2, 3 or 4
- $(-O-CF_2CF_2-)_n$ where n is 1, 2, 3, 4, 5, 6 or 7
- $(-O-CF_2CF_2CF_2-)_n$ where n is 1, 2, 3, 4, or 5
- $(-O-CF_2CF_2CF_2CF_2-)_n$ where n is 1, 2 or 3
- $(-O-CF_2CF(CF_3)-)_n$ where n is 1, 2, 3, 4, or 5
- $(-O-CF_2CF(CF_2CF_3)-)_n$ where n is 1, 2 or 3
- $(-O-CF(CF_3)CF_2-)_n$ where n is 1, 2, 3, 4 or 5
- $(-O-CF(CF_2CF_3)CF_2-)_n$ where n is 1, 2 or 3
- $(-O-CF_2CF(CF_3)-)_n-O-CF_2CF_2-$ where n is 1, 2, 3 or 4
- $(-O-CF_2CF(CF_2CF_3)-)_n-O-CF_2CF_2-$ where n is 1, 2 or 3
- $(-O-CF(CF_3)CF_2-)_n-O-CF_2CF_2-$ where n is 1, 2, 3 or 4
- $(-O-CF(CF_2CF_3)CF_2-)_n-O-CF_2CF_2-$ where n is 1, 2 or 3
- $-O-(CF_2)_n-$ where n is 1, 2, 3, 4, 5, 6, 7, 8, 9, 10, 11, 12, 13 or 14

Fluoromonomers may be synthesized by any suitable method, including methods disclosed in U.S. patent application Ser. No. 10/322,226, filed Dec. 17, 2002, the disclosure of which is incorporated herein by reference.

In one embodiment, the PEM is composed of a polymer blend meeting the recited ranges for EW and Tg. The polymers are miscible in the amounts used. At least one of the polymers is highly fluorinated and acid-functional, as described above. Typically, additional polymers are highly fluorinated as well, and more typically perfluorinated. To be miscible with the first polymer, additional polymers are likely but not necessarily acid-functional as well.

In another embodiment, the PEM is composed of a polymer meeting the recited ranges for EW and Tg having a highly fluorinated backbone and at least two different pendant groups, at least one being an acid-functional group as described above. Additional pendant groups may be any suitable groups. Additional pendant groups may be aromatic or non-aromatic, straight-chain or branched, and may contain heteroatoms. Additional pendant groups may be, but are not necessarily, acid-functional groups as described above.

In the method according to the present invention, the polymer or polymer blend is provided in a suspension or solution for casting. Any suitable carrier or solvent may be used, typically including water. The membrane is cast by any suitable method, including bar coating, spray coating, slit coating, brush coating, and the like. The casting is typically dried prior to annealing, typically at an elevated temperature, typically between 30° C. and 130° C. Annealing is carried out at a temperature Ta equal to Tg+X where X is at least 10° C. More typically, X is at least 25° C., more typically at least 40° C., and most typically at least 55° C. Ta is typically 210° C. or less and more typically 200° C. or less. Duration of annealing is typically between 1 and 30 minutes.

Typically the PEM according to the present invention has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials or according to methods that provide sufficient structural strength.

This invention is useful in polymer electrolyte membrane fuel cells.

Objects and advantages of this invention are further illustrated by the following examples, but the particular materials and amounts thereof recited in these examples, as well as other conditions and details, should not be construed to unduly limit this invention.

EXAMPLES

Unless otherwise noted, all reagents were obtained or are available from Aldrich Chemical Co., Milwaukee, Wis., or may be synthesized by known methods.

Measurement of Tg

Tg was measured by dynamic mechanical analysis (DMA). In DMA, a sample of a polymer to be tested is clamped in a test apparatus that applies an oscillating force and measures the resulting displacement of the sample. The process is carried out in a temperature controlled environment. Temperature is ramped upward as measurements are taken. From this data, the apparatus typically calculates, records and displays the elastic modulus (E'), loss modulus (E"), and damping factor (tan delta) of the sample as a function of temperature. Tg is taken to be the maximum in tan delta.

In the present examples, a Rheometrics Solid Analyzer RSA II (TA Instruments, New Castle, Del., USA) was used at a frequency of 1 Hertz (6.28 rad/sec). A thin strip of sample was tested, measuring about 6.5 mm wide by about 25 mm long by about 30-38 microns thick. Measurements were taken under tension over the temperature range of 25° C. to 200° C.

Sample Preparation

Polymer membrane samples for testing were cast by knife coating out of a water/propanol suspension (30-50% water) containing 20% solids onto glass plate or PET film, dried at 80° C. for 10 minutes, and annealed at 200° C. for 10 minutes.

Measured Tg Values

Tg values for samples of Nafion® membrane having various equivalent weights (comparative samples) were measured by DMA as described above and are reported in Table II:

TABLE II

| Equivalent Weight | Tg |
| --- | --- |
| 925 | 100° C. |
| 1000 | 98° C. |
| 1100 | 85° C. |

Blended Polymer

Tg values for blended and unblended polymer membranes were measured by DMA as described above and are reported in Table III:

TABLE III

| Membrane Composition (EW) | Tg |
| --- | --- |
| Nafion ® (1000) | 89° C. |
| 25/75 Nafion ® (1000)/Polymer A (980) | 103° C. |
| Polymer A (980) | 115° C. |

Polymer A is a copolymer of TFE and a monomer according to the formula:

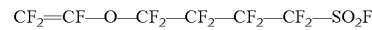

where $SO_2F$ groups had been hydrolyzed to $SO_3H$ groups, as disclosed in U.S. patent application Ser. No. 10/325,278, filed Dec. 19, 2002, the disclosure of which is incorporated herein by reference.

The 25/75 blend of Nafion® and Polymer A exhibited a single Tg intermediate between the Tg of Nafion® and the Tg of Polymer A, demonstrating that the two polymers were miscible.

Terpolymer

Tg values were measured by DMA as described above for a terpolymer of TFE, $CF_2$=CF—O—$CF_3$ and $CF_2$=CF—O—$CF_2$—$CF_2$—$CF_2$—$CF_2$—$SO_2F$ in molar ratios of 83.5/5.0/11.5, where $SO_2F$ groups have been hydrolyzed to $SO_3H$ groups. The polymer was made as disclosed in U.S. patent application Ser. No. 10/325,278, filed Dec. 19, 2002, with the addition of the $CF_2$=CF—O—$CF_3$ monomer in pre-emulsion. The Equivalent Weight of the resulting polymer was 1177, by calculation. The measured Tg was 110° C.

Various modifications and alterations of this invention will become apparent to those skilled in the art without departing from the scope and principles of this invention, and it should be understood that this invention is not to be unduly limited to the illustrative embodiments set forth hereinabove.

We claim:

1. A method of making a polymer electrolyte membrane comprising the steps of:
    a) providing a suspension or solution of a blend of at least two miscible polymers, at least one of said polymers comprising a highly fluorinated backbone and at least one pendant group comprising a sulfonic acid group, wherein said blend of polymers has an equivalent weight of less than 1200, and wherein said blend of polymers has a Tg of between 101° C. and 155° C.;
    b) casting a membrane from said suspension or solution; and
    c) annealing said membrane at a temperature Ta equal to Tg+X where X is at least 10° C. and Ta is no more than 210° C.

2. The method according to claim 1 wherein said blend of polymers has a Tg of between 110° C. and 140° C.

3. The method according to claim 1 wherein X is at least 55° C.

4. The method according to claim 1 wherein Ta is at least 135° C.

5. The method according to claim 1 wherein said blend of polymers has an equivalent weight of less than 1050.

6. The method according to claim 1 wherein at least one of said polymers comprises pendant groups according to the formula:

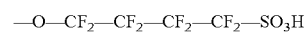  (I).

7. The method according to claim 1 wherein at least one of said polymers comprises pendant groups according to the formula:

$$-O-CF_2-CF(CF_3)-O-CF_2-CF_2-SO_3H \quad (II).$$

8. The method according to claim 1 wherein said membrane has a thickness of 90 microns or less.

9. A method of making a polymer electrolyte membrane comprising the steps of:
   a) providing a suspension or solution of a polymer, said polymer comprising a highly fluorinated backbone and at least two different pendant groups, at least one of said pendant group comprising a sulfonic acid group, wherein said polymer has an equivalent weight of less than 1200, and wherein said polymer has a Tg of between 110° C. and 140° C.;
   b) casting a membrane from said suspension or solution; and
   c) annealing said membrane at a temperature Ta equal to Tg+X where X is at least 10° C. and Ta is no more than 210° C.

10. A method of making a polymer electrolyte membrane comprising the steps of:
    a) providing a suspension or solution of a polymer, said polymer comprising a highly fluorinated backbone and at least two different pendant groups, at least one of said pendant group comprising a sulfonic acid group, wherein said polymer has an equivalent weight of less than 1200, and wherein said polymer has a Tg of between 101° C. and 155° C.;
    b) casting a membrane from said suspension or solution; and
    c) annealing said membrane at a temperature Ta equal to Tg+X where X is at least 10° C. and Ta is no more than 210° C.;
    wherein at least one of said pendent groups is according to the formula:

$$-O-CF_2-CF(CF_3)-O-CF_2-CF_2-SO_3H \quad (II).$$

11. A method of making a polymer electrolyte membrane comprising the steps of:
    a) providing a suspension or solution of a polymer comprising a highly fluorinated backbone and at least one pendant group comprising a sulfonic acid group, wherein said pendent groups are not according to the formula:

$$-O-CF_2-CF_2-CF_2-CF_2-SO_3H \quad (I)$$

wherein said polymer has an equivalent weight of less than 1200, and wherein said polymer has a Tg of between 110° C. and 140° C.;
    b) casting a membrane from said suspension or solution; and
    c) annealing said membrane at a temperature Ta equal to Tg+X where X is at least 10° C. and Ta is no more than 210° C.

12. A polymer electrolyte membrane comprising a blend of at least two miscible polymers, at least one of said polymers comprising a highly fluorinated backbone and at least one pendant group comprising a sulfonic acid or sulfonate group, wherein said blend of polymers has an equivalent weight of less than 1200, and wherein said blend of polymers has a Tg of between 101° C. and 155° C.

13. The polymer electrolyte membrane according to claim 12 wherein said blend of polymers has a Tg of between 110° C. and 140° C.

14. The polymer electrolyte membrane according to claim 12 wherein said blend of polymers has an equivalent weight of less than 1050.

15. The polymer electrolyte membrane according to claim 12 wherein at least one of said polymers comprises pendant groups according to the formula:

$$-O-CF_2-CF_2-CF_2-CF_2-SO_3H \quad (I).$$

16. The polymer electrolyte membrane according to claim 12 wherein at least one of said polymers comprises pendant groups according to the formula:

$$-O-CF_2-CF(CF_3)-O-CF_2-CF_2-SO_3H \quad (II).$$

17. The polymer electrolyte membrane according to claim 12 which is a cast, annealed membrane.

18. The polymer electrolyte membrane according claim 12 wherein said membrane has a thickness of 90 microns or less.

19. The polymer electrolyte membrane according to claim 17 wherein said membrane has a thickness of 90 microns or less.

20. A fuel cell membrane electrode assembly comprising the polymer electrolyte membrane according to claim 12.

21. A polymer electrolyte membrane comprising a polymer, said polymer comprising a highly fluorinated backbone and at least two different pendant groups, at least one of said pendant group comprising a sulfonic acid group, wherein said polymer has an equivalent weight of less than 1200, and wherein said polymer has a Tg of between 110° C. and 140° C.

22. A polymer electrolyte membrane comprising a polymer, said polymer comprising a highly fluorinated backbone and at least two different pendant groups, at least one of said pendant group comprising a sulfonic acid group, wherein said polymer has an equivalent weight of less than 1200, and wherein said polymer has a Tg of between 101° C. and 155° C. wherein at least one of said pendent groups is according to the formula:

$$-O-CF_2-CF(CF_3)-O-CF_2-CF_2-SO_3H \quad (II).$$

23. A polymer electrolyte membrane comprising a polymer comprising a highly fluorinated backbone and at least one pendant group comprising a sulfonic acid group, wherein said pendent groups are not according to the formula:

$$-O-CF_2-CF_2-CF_2-CF_2-SO_3H \quad (I)$$

wherein said polymer has an equivalent weight of less than 1200, and wherein said polymer has a Tg of between 110° C. and 140° C.

24. A fuel cell membrane electrode assembly comprising the polymer electrolyte membrane made by the method according to claim 1.

* * * * *

UNITED STATES PATENT AND TRADEMARK OFFICE
CERTIFICATE OF CORRECTION

PATENT NO. : 7,285,349 B2 Page 1 of 1
APPLICATION NO. : 10/697831
DATED : October 23, 2007
INVENTOR(S) : Steven J. Hamrock et al.

It is certified that error appears in the above-identified patent and that said Letters Patent is hereby corrected as shown below:

Title Page

Item [56], References Cited, OTHER PUBLICATIONS,
    delete "10/325,275" and insert -- 10/325,278 -- therefor.
    delete "comoparison" and insert -- comparison -- therefor.

Column 10

Claim 18, Line 21;
    delete "according claim" and insert -- according to claim -- therefor.

Signed and Sealed this

Twenty-fifth Day of December, 2007

JON W. DUDAS
*Director of the United States Patent and Trademark Office*